US008688992B2

(12) United States Patent
Daniels et al.

(10) Patent No.: US 8,688,992 B2
(45) Date of Patent: Apr. 1, 2014

(54) SYSTEM AND METHOD FOR GENERATING AGREEMENTS

(75) Inventors: Shawn Daniels, North Vancouver (CA); Petr Kubon, Burnaby (CA); Goran Radisavljevic, Vancouver (CA)

(73) Assignee: Recombo, Inc., Vancouver, British Columbia (CA)

( * ) Notice: Subject to any disclaimer, the term of this patent is extended or adjusted under 35 U.S.C. 154(b) by 1877 days.

(21) Appl. No.: 11/934,487

(22) Filed: Nov. 2, 2007

(65) Prior Publication Data

US 2008/0184033 A1 Jul. 31, 2008

Related U.S. Application Data

(60) Provisional application No. 60/864,141, filed on Nov. 2, 2006.

(51) Int. Cl.
*H04L 29/06* (2006.01)

(52) U.S. Cl.
USPC ................ 713/176; 726/26; 726/27; 726/28; 726/29; 726/30; 713/175

(58) Field of Classification Search
USPC .................................. 713/175; 715/272, 273
See application file for complete search history.

(56) References Cited

U.S. PATENT DOCUMENTS

| | | | |
|---|---|---|---|
| 5,606,609 A * | 2/1997 | Houser et al. ................. | 713/179 |
| 5,669,005 A | 9/1997 | Curbow et al. | |
| 6,260,145 B1 * | 7/2001 | Komura et al. ............... | 713/176 |
| 6,289,460 B1 | 9/2001 | Hajmiragha | |
| 6,684,212 B1 | 1/2004 | Day et al. | |
| 6,742,163 B1 * | 5/2004 | Ono et al. .................... | 715/236 |
| 7,072,940 B1 | 7/2006 | Day et al. | |
| 7,111,230 B2 | 9/2006 | Euchner et al. | |
| 7,124,362 B2 | 10/2006 | Tischer | |
| 7,475,334 B1 * | 1/2009 | Kermani ....................... | 715/229 |
| 2001/0018739 A1 * | 8/2001 | Anderson et al. ............. | 713/176 |
| 2002/0016816 A1 * | 2/2002 | Rhoads ......................... | 709/203 |
| 2002/0073163 A1 | 6/2002 | Churchill | |
| 2002/0091927 A1 * | 7/2002 | Wall ............................. | 713/176 |
| 2002/0143691 A1 | 10/2002 | Ramaley | |
| 2002/0156850 A1 * | 10/2002 | Hamscher et al. ............ | 709/205 |
| 2002/0188638 A1 * | 12/2002 | Hamscher .................... | 707/530 |
| 2003/0061487 A1 * | 3/2003 | Angelo et al. ................ | 713/176 |
| 2004/0085354 A1 | 5/2004 | Massand | |
| 2004/0133639 A1 | 7/2004 | Shuang | |
| 2004/0172450 A1 | 9/2004 | Edelstein | |
| 2004/0197029 A1 * | 10/2004 | Brundage et al. ............ | 382/306 |
| 2004/0205653 A1 | 10/2004 | Hadfield | |

(Continued)

OTHER PUBLICATIONS

Bulterman, Dick C. A., et al., A Structure for Transportable Dynamic Multimedia Documents, CW]: Centrum voor WJskunde en Informatica, The Netherlands, Usenix, 1991. Provided by Applicants in IDS.*

(Continued)

*Primary Examiner* — Jeffrey Pwu
*Assistant Examiner* — Thomas C Lauzon
(74) *Attorney, Agent, or Firm* — Burns & Levinson LLP; Orlando Lopez

(57) ABSTRACT

System and method for creation and use of an agreement object having content packages and a transportable agreement, including both the content of the agreement and data used to validate the signatories and an audit trail for the agreement.

24 Claims, 17 Drawing Sheets

(56) References Cited

U.S. PATENT DOCUMENTS

| | | |
|---|---|---|
| 2004/0221323 A1 | 11/2004 | Watt |
| 2005/0050468 A1* | 3/2005 | Cheng et al. ............ 715/530 |
| 2005/0080644 A1 | 4/2005 | Greef |
| 2005/0086296 A1 | 4/2005 | Chi |
| 2005/0120199 A1 | 6/2005 | Carter |
| 2005/0138541 A1 | 6/2005 | Euchner |
| 2005/0216556 A1 | 9/2005 | Manion |
| 2005/0240771 A1* | 10/2005 | Ginter et al. ............ 713/176 |
| 2005/0283609 A1* | 12/2005 | Langford ................ 713/176 |
| 2006/0026502 A1 | 2/2006 | Dutta |
| 2006/0117249 A1 | 6/2006 | Hu |
| 2007/0143663 A1 | 6/2007 | Hansen |
| 2007/0208994 A1 | 9/2007 | Reddel |

OTHER PUBLICATIONS

Bulterman, Dick C. A., et al., A Structure for Transportable Dynamic Multimedia Documents, CWI: Centrum voor Wiskunde en Informatica, The Netherlands, Usenix, 1991.

\* cited by examiner

| | Folders ▾ | Manage ▾ | Actions ▾ | New Agreement ▾ | | |
|---|---|---|---|---|---|---|
| | Ic # ▾ | Name | Subject | | Company | Status |
| ☐ | 5218 | PI_Financial_Corp.v0.2.html | 5 | | Recombo | Completed |
| ☐ | 5217 | Agreement_to_bs_attached_to_e... | test | | Recombo | Completed |
| ☐ | 5216 | testHTMLPublish.htm | test signal status 2 | | Super Duper ... | Completed |
| ☐ | 5215 | testHTMLPublish.htm | test signal status | | Super Duper ... | Published |
| ☐ | 5214 | PI_Financial_Corp.v0.2.html | yes | | Recombo | Completed |
| ☐ | 5213 | PI_Financial_Corp.v0.2.html | no | | Recombo | Completed |
| ☐ | 5212 | PI_Financial_Corp.v0.2.html | test13 | | Recombo | Completed |
| ☐ | 5211 | PI_Financial_Corp.v0.2.html | test12 | | Recombo | Completed |
| ☐ | 5210 | PI_Financial_Corp.v0.2.html | popup test | | Super Duper ... | Completed |
| ☐ | 5209 | PI_Financial_Corp.v0.2.html | test7 | | Recombo | Completed |
| ☐ | 5208 | PI_Financial_Corp.v0.2.html | test5 | | Recombo | Completed |
| ☐ | 5207 | PI_Financial_Corp.v0.2.html | test3 | | Recombo | Completed |
| ☐ | 5206 | PI_Financial_Corp.v0.2.html | test2 | | Recombo | Completed |
| ☐ | 5205 | PI_Financial_Corp.v0.2.html | test | | Recombo | Completed |
| ☐ | 5204 | Eoric_Demo.html | TBP' | | Super Duper ... | In Progress |
| ☐ | 5202 | Mult-par.Agreement | | | Super Duper ... | Completed |
| ☐ | 5201 | testHTMLPublish.htm | MP1 | | Super Duper ... | Completed |
| ☐ | 5200 | test.html | MP1 | | Super Duper ... | Completed |
| ☐ | 5199 | test.html | test sf | | Super Duper ... | Completed |
| ☐ | 5198 | Eoric_Demo.html | TBP' | | Super Duper ... | Completed |

Agreement Manager
- Dashboard
- Agreements
  - Unfiled
  - pepe's special folder
- Trash

FIG. 4

AGREEMENT DETAILS

| User | Email | Date | Status | |
|---|---|---|---|---|
| Pepe Kubon | pkubon@recombo.com | 31-Oct-07 00:36:19 | Accepted | Resend |
| Pepe Kubon | pepe@recombo.com | 31-Oct-07 00:37:35 | Accepted | Resend |

Close

Document Manager
Dashboard
Agreements
 Unfiled
 pepe's sp
 Trash

| | | | | | |
|---|---|---|---|---|---|
| ☐ 5204 | Eorig_Demo.html | TB P1 | Super Duper ... | In Process |
| ☐ 5202 | Multi-part Agreement | | Super Duper ... | Completed |
| ☑ 5201 | testHTMLPublish.html | MP1 | Super Duper ... | Completed |
| ☐ 5200 | test.html | MP1 | Super Duper ... | Completed |
| ☐ 5199 | test.html | test sf | Super Duper ... | Completed |
| ☐ 5198 | Eorig_Demo.html | TB P1 | Super Duper ... | Completed |

FIG. 7

```
<SPAN
id="signatureForm"??0Ch4%0EConfirmation+%2D+%3DDOCUMENT_NAME%3D+%29%0C%
2Fh4%3E%9Cp+class%3D%27signatureBlocks%27%3EC%2C+%3DNAME%2C+reviewed
+%3DDOCUMENT_NAME%3D-cn+%3DDATE_OF_SIGNING%3D%3C%2Fp%3E%3Cpre+class%3D%
27signatureBlocks%27-%0E%0A%0C%2Dpre%0D</SPAN>
<SPAN id="creationDate">2006-09-26</SPAN>
<SPAN id="dueDate">2006-11-04</SPAN>
<SPAN id="reminderDate"></SPAN>
<DIV id="content"><SPAN id="contentId">17283</SPAN>
<SPAN id="title">Agreement.html</SPAN>
<SPAN id="description">Agreements to sign</SPAN>
<DIV id="contentFile"><SPAN id="filename">test.html</SPAN>
<SPAN id="contentFileId">5492B125-5C75-0D2F-2AAA-368C3A26D2C9</SPAN>
<DIV id="recipient1"><SPAN id="userNameR1">pkubon@recombo.com</SPAN>
<SPAN id="givenNameR1">Kubon</SPAN>
<SPAN id="emailAddressR1">pkubon@recombo.com</SPAN>
</DIV>
</DIV>
<DIV id="SigningWorkFlow"><DIV id="SigningRequestDist">
<DIV id="SR1"><SPAN id="ref-SR1">sigid?192735480526</SPAN>
<SPAN id="userNameSR2">pkubon@recombo.com</SPAN>
</DIV></DIV>
<DIV id="signingOrderList"><DIV id="SOType"><SPAN
```

FIG. 13

IN WITNESS WHEREOF, the parties have executed this Agreement as of the date first set forth above.

Recombo Inc.

By:
Name: Sign Here: pkubon@recombo.com
Title:

Commit Signature

UserName:
pkubon@recombo.com

Password:

Forgot Password?

Accept

FIG. 16

SYSTEM AND METHOD FOR GENERATING AGREEMENTS

CROSS REFERENCE TO RELATED APPLICATIONS

This application claims priority under 35 U.S.C. §119 from U.S. Provisional Patent Application Ser. No. 60/864141 entitled SYSTEMS AND METHODS OF GENERATING AGREEMENTS, filed on Nov. 2, 2006.

BACKGROUND OF THE INVENTION

What is needed is a system to provide for modification to contracts during the contracting process. If the validity of electronic contracts are dependant on proprietary systems, the company or system that brokered the transaction could fail, and the agreement may be lost. Also, if absolute positioning of signature areas by publishers is required, the possibility of advanced processing of content data could be precluded.

SUMMARY

The needs set forth above as well as further and other needs and advantages are addressed by the present invention. The solutions and advantages of the present invention are achieved by the illustrative embodiment described herein below.

The embodiment herein described relates to the creation, transmission, distribution and execution of agreements. In particular, the embodiment relates (1) to electronic or digital agreements which are by themselves complete and auditable, and (2) to processes and systems for generating such agreements.

The systems and methods described herein provide for the use of an agreement object which may include a standard electronic agreement, which may include content packages and a transportable agreement which may include within it both the content of the agreement and data used to validate the signatories and an audit trail for the agreement. The agreement object may be considered a domain object of the system. The system may also include a server component which is responsible for managing the creation, deployment, and delivery of the client components such as the agreement object as well as tracking interactions with and between domain entities.

BRIEF DESCRIPTION OF THE DRAWINGS

FIG. 4 is an example of a content interface;

FIG. 7 is a computer screen shot illustrating an example of a report detail interface which identifies the users who have agreed to the legal agreement;

FIG. 13 is a computer code listing illustrating a sample of an audit trail embedded into a transportable agreement;

FIG. 16 is a computer screen shot illustrating an example of how a signatory may sign an agreement.

DETAILED DESCRIPTION OF THE EMBODIMENTS

Figure 1:
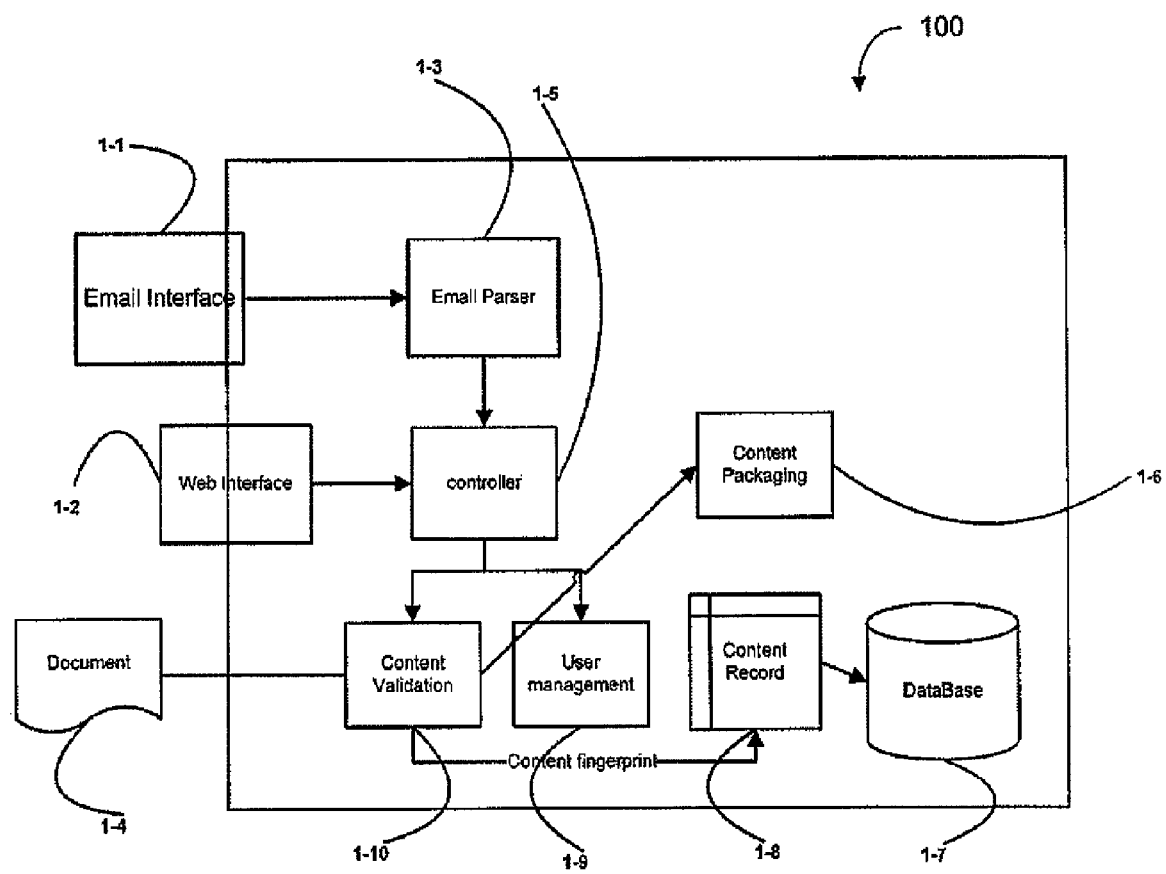
FIG. 1 is a flow diagram illustrating an overview of the publishing process which involves uploading or linking content to the system.

The present system is now described more fully hereinafter with reference to the accompanying drawings, in which the illustrative embodiment of the present disclosure is shown. The following configuration description is presented for illustrative purposes only. Any computer configuration satisfying the speed and interface requirements herein described may be suitable for implementing the system of the present disclosure.

An embodiment of an electronic contracting system created according to the description herein may include various modules such as, for example, a document creation module configured to support embedding data into and recovering data from an agreement at each step of an active portion of a lifecycle of the agreement, and configured to include coding in the agreement, where the coding is required by a computer system to provide dynamic integrations with other systems; a document completion module configured to move the agreement through the lifecycle to become a completed agreement; an electronic vaulting module in which completed agreements can be stored, searched on, and accessed. The electronic contracting system may also include identity module which allow the electronic contract system to demonstrate that contracts were signed by the appropriate signatories. The electronic contracting system may also provide for secure hashing of completed agreements, which may be used to verify that all signatories signed the same document, and that that document has not been altered. The electronic contracting system may also include a publishing module which provides the ability to convert documents into usable electronic agreements; this may include a facility for determining where in absolute terms an electronic signature may be applied to an electronic document. The electronic contracting system may also provide a distribution module which allows signatories to be informed that there is a document requiring their signature, including methods and processes for tracking interactions with digital contracts and the like.

The transportable agreement of the present embodiment may take the form of a transportable agreement object which encompasses an agreement between two or more parties, which carries all necessary information for validation and enforcement of the agreement, and which does not require any specific archiving environment. A traditional paper contract is an analogous form of such an agreement. A paper contract does not have any particular requirements for storage, can be modified and re-signed, and so forth. The format for transportable agreement objects may include, but is not limited to, Extensible Hypertext Markup Language (XHTML) or Hypertext Markup Language (HTML) format. The underlying environment of the transportable agreement may be a framework of Internet-based client-side executable code, such as European Computer Manufacturer's Association (ECMA) script, JAVA applets, and the like, combined with Dynamic HTML (DHTML) and (X)HTML. While there are many variations on how the transportable agreements may be constructed, in one particular embodiment they may contain the following properties. First, data may be embedded into and recovered from documents at each step in the active portion of the document's lifecycle. Second, transportable agreements may include coding required by a computer system to provide dynamic integrations with other systems of record such as, for example, credit card processing interfaces, HTML form data, and the like.

Data collected during the lifecycle of the transportable agreement may be persistent in the transportable agreement itself during its lifecycle. Moreover, the transportable agreement may also contain all business rules relevant to its own execution, for example, rules about the sequence (if any) in which signatories should sign it. The transportable agreement may be validated, in one embodiment, against a registry of such documents, or, in another, within an internal framework. The transportable agreement may be signed by one or more parties in a non-digital medium. This is accomplished in one embodiment by encoding the complete collection of characters into an encoded image in both the digital and printed instances of the transportable agreement.

A computer system is disclosed herein that can mediate between computer applications that provide content and/or data to users, the users being possibly software applications or human users. In some embodiments, the computer system may provide a framework in which the content or data can be dynamically restructured for the consuming entity. The computer system may also provide an irrefutable link between the content viewed, the person viewing it, and a legal agreement between the viewer and an organization or its agent. The computer system can operate so that applications, users, and content are addressed using their main interface, rather than any special integration, modification, or alternate software interface.

According to one embodiment, a computer-implemented method of distributing digital content is provided. The method includes receiving structured data in a server, the structured data comprising digital content, a list of recipients for the digital content, and one or more of: (1) a deadline for viewing the digital content; (2) a deadline for responding to the digital content; and (3) legal agreement related to the digital content. The method further includes storing the digital content in a storage area on a computer readable medium, validating the digital content by constructing a unique representation of the digital content, and sending a notification to the list of recipients regarding the availability of the digital content. The method further provides for receiving a request from one or more of the recipients to review the digital content, validating the request, and retrieving a copy of the stored digital content. The method further provides for authenticating the retrieved digital content using the unique representation of the digital content, and sending the digital content to the recipient.

FIG. 1 illustrates the functional components of a system according to one embodiment of the invention. The illustrated components may execute in one or more general purpose computers, such as a group of servers on a corporate network. The system can include, but is not limited to including, a content publishing module 100 that may be used to bind new content to a platform application so that it may be validated, packaged and disseminated to one or more intended recipients in content packaging 1-6. At least two interfaces may be used to accomplish this binding: (1) an electronic mail (email) interface 1-1, an example of which is shown in FIG. 7 and which is described in further detail below; and (2) an HTTP interface, such as that included in web interface 1-2 or some other HTTP-compliant software. Other interfaces may include web services and remote procedure call (RPC) interfaces. In one embodiment, content publishing module 100 may be accessed in various network environments such as, for example, one which supports TCP/IP standards. However, one of skill in the art will readily appreciate that other network standards may be used.

Continuing to refer to FIG. 1, email parser 1-3 can be configured to extract the structured data sent by email interface 1-1. In an illustrative embodiment, email parser 1-3 may periodically poll an internal email server (not shown). The internal email server may be a commercially-available email server. Although the internal email server may be located within the same system, in other embodiments, the email component including email interface 1-1 and email parser 1-3 may provide a service which accepts, for example, incoming SMPT or POP socket requests and may further process the transmissions directly. The email parser 1-3 may also be configured to populate a data structure, e.g., a content object, which can encapsulate available data about a publishing request and can transfer it to publishing controller 1-5 (see FIG. 4, content interface example, and FIG. 4, content restructuring). Alternatively, web interface 1-2, which may include a collection of web pages, may collect the same data.

Continuing to further refer to FIG. 1, both web interface 1-2 and email parser 1-3 can provide options for attaching content. A first option can allow a user of the system to send content to content publishing module 100 via an HTTP POST operation. Another option allows the user to specify a Uniform Resource Locator (URL), or some other type of hyperlink, from which the content may be accessed. In the former case, the content may stored directly within the system within a file system, a database such as database 1-7, or some other storage structure, or in some other configurable repository. In the latter case, the content can be accessed, streamed into the system, and validated by content validation process 1-10, including generating a secure hash digest (fingerprint) (see FIG. 12) which can be stored in database 1-7 and can be used during runtime (see FIG. 5) to verify that the content remains unchanged after publishing. The content is not necessarily stored in any repository within the system's immediate domain.

Continuing to still further refer to FIG. 1, publishing controller 1-5 may separate the processing required to publish content to the system into several discrete processes. After separating the processing, publishing controller 1-5 may manage the execution of each process. One process, content validation 1-10, can detect and flag the type and format of the incoming content in document 1-4 to be published (content types), and can construct a unique representation of that content. The set of valid content types in the present embodiment can include, but is not limited to including, for example, electronic content such as word processing documents, spreadsheets, presentations, media files, HTML or some other markup language, standards compliant eLearning courseware, and data driven internet applications. After determining the type and format of the content, content validation module 1-10 may construct a unique value, for example, a hash digest for each discrete element of the content using an encryption scheme, e.g., a 256-bit Secure Hash Algorithm (SHA). In alternative embodiments, other forms of content validation may be used such as assigning a Universally Unique Identifier (UUID) generated by a UUID generator. This unique value, or set of values, may then be stored as the authoritative digest(s) for that content.

Continuing to even still further refer to FIG. 1, user management 1-9 can determine appropriate access to the content, which may be included in the publishing transmission or added to the transmission subsequently via web interface 1-2. In the case of the standard electronic agreement, content record 1-8 can contain, in one location, pertinent information about the content, including a reference to the system's representation of the content, the legal agreement associated with the content, for example, in its entirety, and metadata about the content. Content record 1-8 can be configured, for example, so that it can only be written a single time and not modifiable at a later date.

Figure 2:
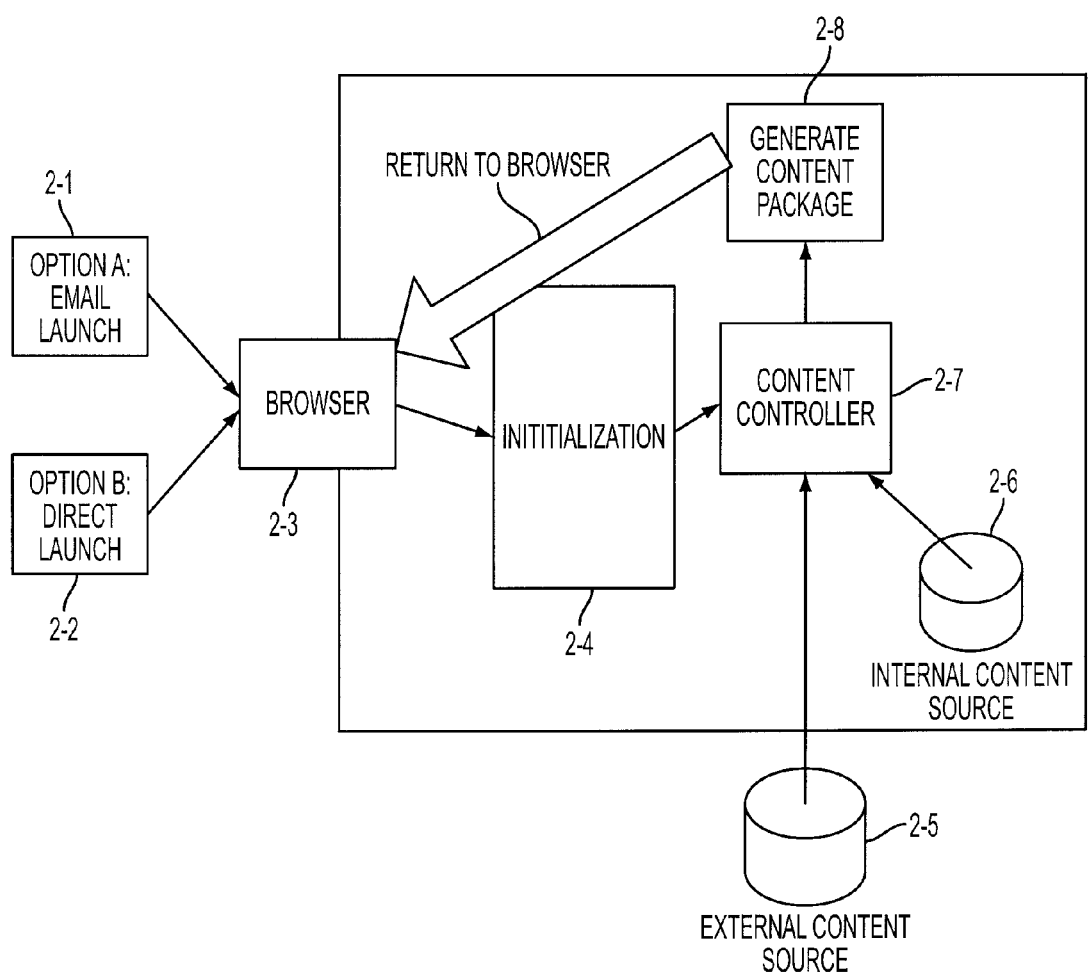
FIG. 2 is a flow diagram illustrating an overview of an exemplary launching process which shows how content packages are launched.

FIG. 2 is an illustrative embodiment of how a recipient user may use the system to access content sent to it through the system. The recipient may access a content package created during the step of generating 2-8 the content package in at least three ways that may be configured by a system administrator or some other entity. The recipient may activate 2-1 a hyperlink contained within an email. In another embodiment, the recipient may access the content by direct interaction 2-2 with the web interface of the system. In yet another embodiment, the recipient may browser launch 2-3 a content package located on an external system. In each embodiment, sufficient information may be sent to a server component to allow the step of initialization 2-4 of the server component to initialize or withhold the content package. If the server component initializes the content package, the server component may display it to the recipient. If the content package is withheld, the server component may send an error message via an HTTP client.

Continuing to refer to FIG. 2, the step of initialization 2-4 may include decryption of encrypted parameters used in activation step 2-1, direct interaction step 2-2, or browser launch step 2-3. The step of initialization 2-4 may also include the step of validating a source of browser launch step 2-3 by tracing the source of the request and leveraging the source system's validation scheme. Where browser launch step 2-3 is initiated via activation step 2-1 or direct interaction step 2-2, the step of initialization 2-4 may be configured to evaluate credentials provided by the user. Once the user is validated, the system can generate 2-8 a unique content package required for the user according to a context determined by the administrator. Core content may be provided by internal content source 2-6, which may be either internal to the server component, or external content source 2-5, or some combination of the two. It does not rely on specific environments for the access, use, or validation of the core content used.

Continuing to still hither refer to FIG. 2, content controller 2-7 can be configured to ensure that content is seamlessly linked to the content's metadata, the uniquely identifying hash string generated for it, the determined structure of the content, and any legal agreements that are associated with it. Content controller 2-7 may, upon linking the content to the other data, generate 2-8 a content package, which is an instance of a general package for the core content produced for the individual recipient. The content package may contain, for example, some or all of the following attributes: an indication that the recipient has chosen to enter into a legal agreement provided within the package, an indication that the recipient has chosen to avail himself of any included interaction with the package such as simulations or assessments, and an indication that the user has chosen to peruse the content without commitment.

Figure 3:
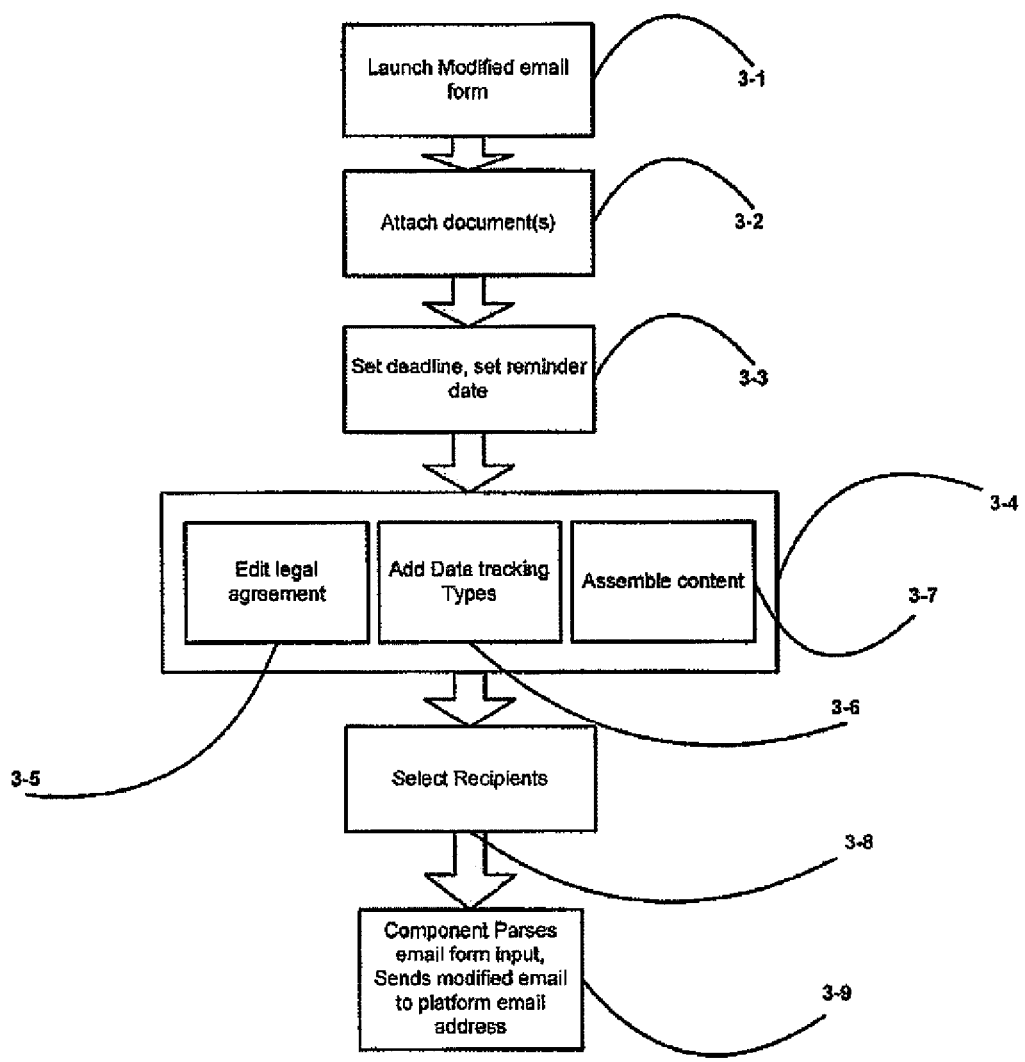
FIG. 3 is a flow diagram illustrating an exemplary process for creating, sending, and publishing electronic content via an email client.
Figure 8:
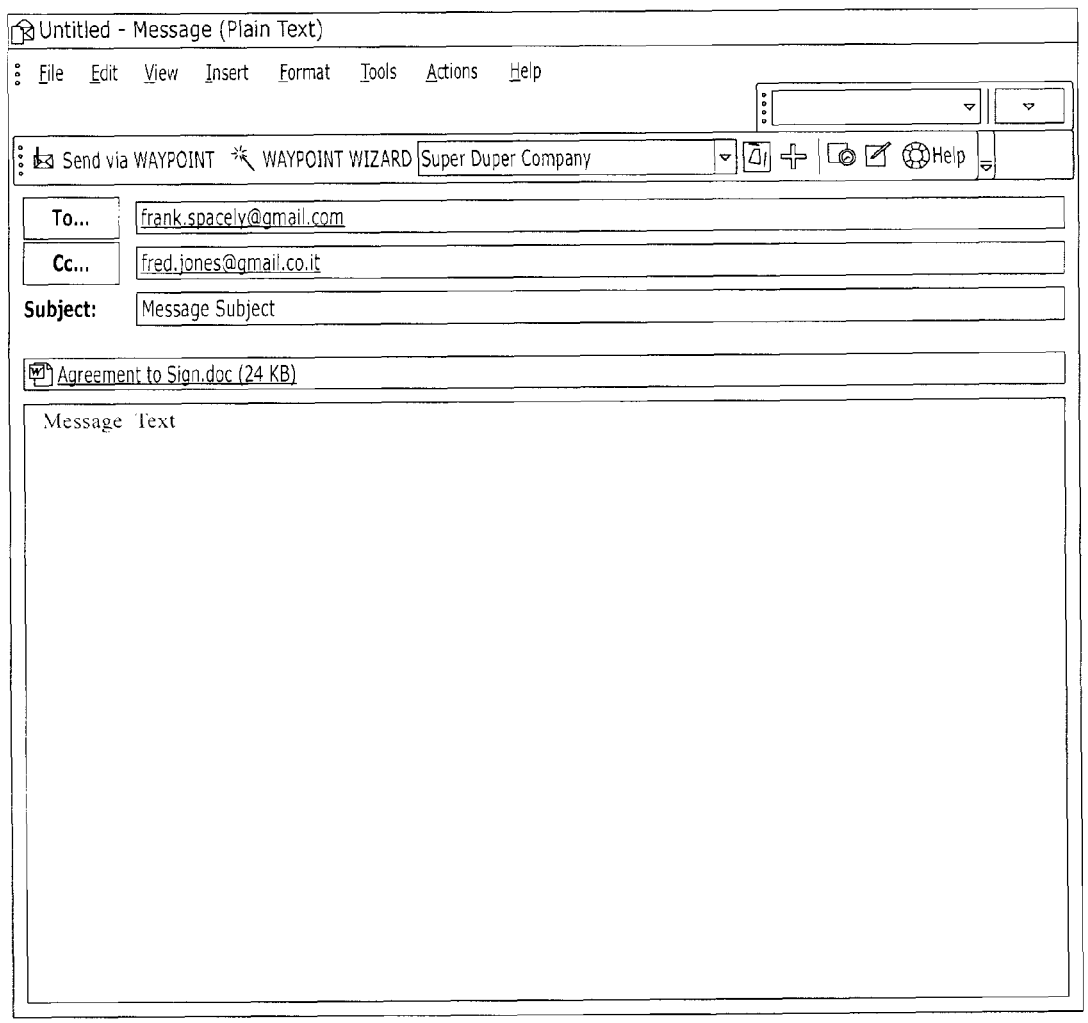
FIG. 8 is computer screen shot illustrating an example of an email form that may be used to create a structured data set and publish a content package.
Figure 9:
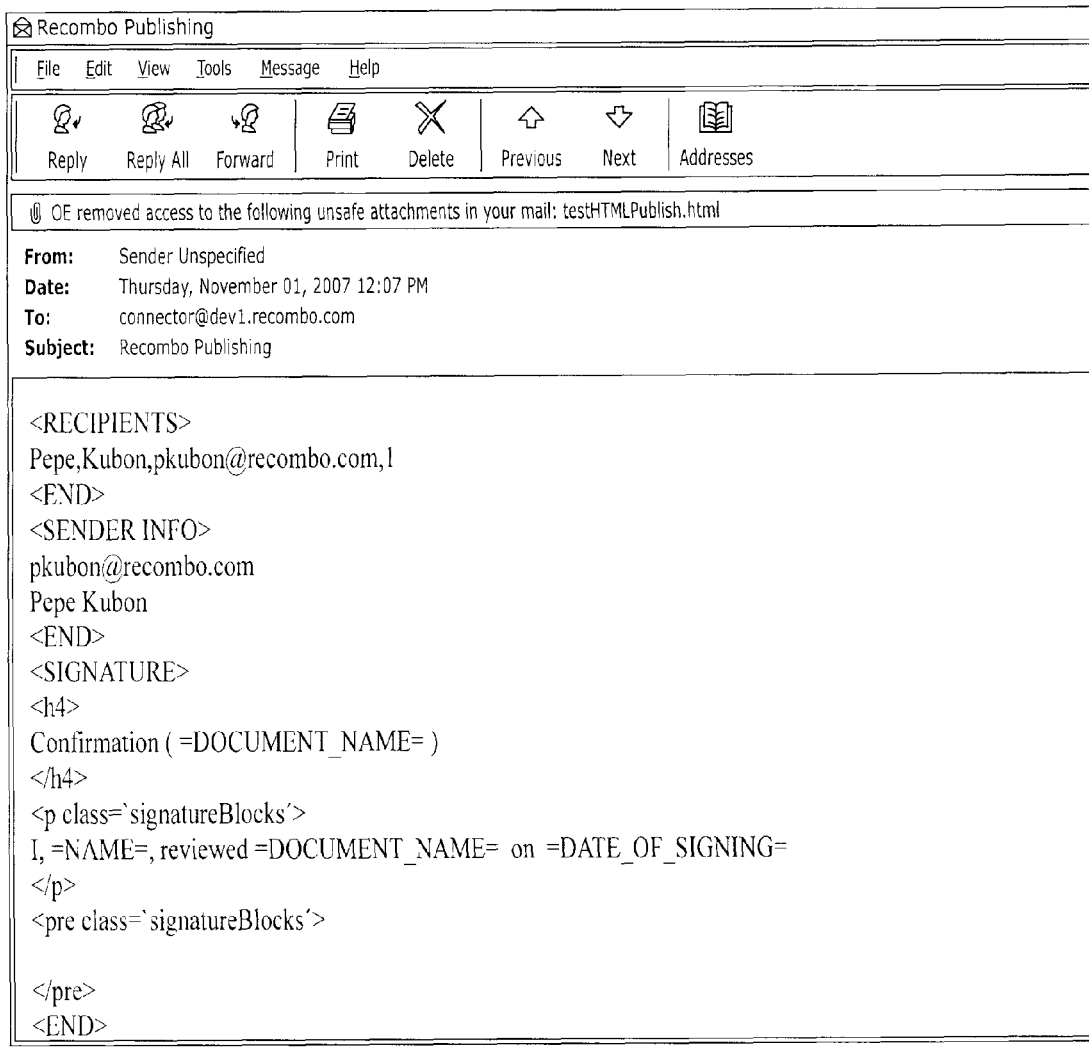
FIG. 9 is an illustrative example of how an email message is parsed as it is sent to the system's mail service.

FIG. 3 illustrates an example of the steps taken by a user of an electronic mail (email) component in accordance with an illustrative embodiment. The email component may be a modified version of a commercially-available email program, the program itself and the modifications to which allow a user to perform the actions described in the diagram. The series of steps can include, but is not limited to including, launching 3-1 a modified email form to initiate a new email form such as, for example, the form shown in FIG. 8. In one embodiment, this is a graphic control in a desktop application, although in other embodiments, it may be a text based command such as a hyperlink in the user interface of a server-side email system, or a portion of a web services transaction. The email component can be configured to reorganize user input into a set of parameters. These parameters may be expressed in a proprietary format, an XML-based format, or other structure that allows the input to be interpreted by the server component. Another step, attaching documents 3-2 can be configured to invoke the email client's document attachment mechanism, and can allow one or more documents to be associated with the new email form and to be included in the subsequent email transmission. Setting deadlines/reminder dates 3-3 receives user input to specify both a due date by which time end-users of the system should access and respond to the content, and a reminder date which can inform the system when both the assignees and the administrator assigning the content should be notified if any outstanding assignees have not accessed the content or taken action on a legal agreement. The step of increasing 3-4 the value of the content can be accomplished by the steps of editing 3-5 a legal agreement, adding 3-6 data tracking types, and assembling 3-7 content. In one embodiment, the step of editing 3-5 a legal agreement can include the step of providing an interface for adding a legal agreement that will be included in the content package. Alternate embodiments may include the steps of embedding an object within existing documents of varied types which can allow for the acceptance of a digital signature. The step of adding 3-6 data tracking types can include the step of allowing the administrator of the system to specify that specific types of interactive user data be tracked in regards to generic, unstructured, and/or semi-structured content. These tracked data may include such items time viewed, document viewed, Computer Managed Interaction (CMI) data, and other data. The step of assembling 3-7 content can include the step of restructuring the content into alternate output formats, or content packages. For example, documents can be separated or merged into discrete units, to which usage data can be applied. The various content packages implemented and envisioned are discussed elsewhere. The step of selecting 3-8 recipients can include the steps of reading and removing individuals and groups from the recipient list contained in the new email form and inserting them into a structured parameter list contained within the body of the outgoing email. The steps of parsing 3-9 email form input and sending modified email to a platform email address can include the steps of receiving, from an administrator, a "send" command, reorganizing each parameter generated in steps 3-2 through 3-8 into a structured document and sending that document, and any included attachments to the server component.

Figure 5:
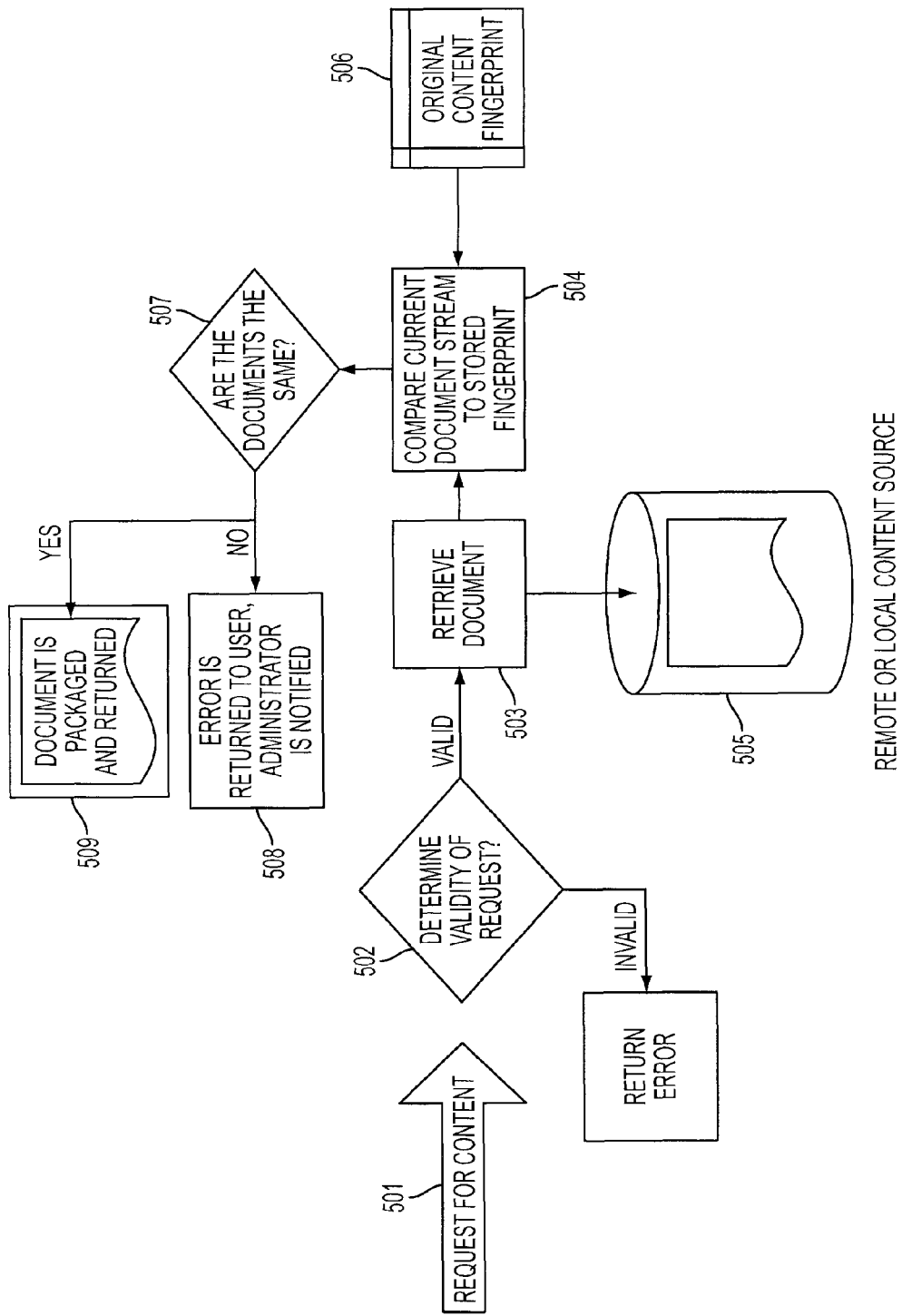
FIG. 5 is a flow diagram showing an illustrative embodiment of a process for ensuring that content, when viewed by a recipient, is verified as identical to the original content.

Referring now primarily to FIG. 5, content validation 1-10 (FIG. 1) can include the steps of requesting 501 the content. If 502 the request is not valid, content validation 1-10 includes the step of returning an error. If 502 the request is valid, content validation 1-10 includes the steps of retrieving 503 the requested document, and comparing 504 a current document stream to a stored fingerprint 506 for the document. If 507 the documents are the same, then the document is validated, and content validation 1-10 includes the step of returning 509 the package. If 507 the documents are not the same, content validation 1-10 includes the step of generating 508 an error message to the requesting user. Optionally, content validation 1-10 can include the step of notifying a system administrator. Content can be derived from remote or local content source 505.

Figure 6:
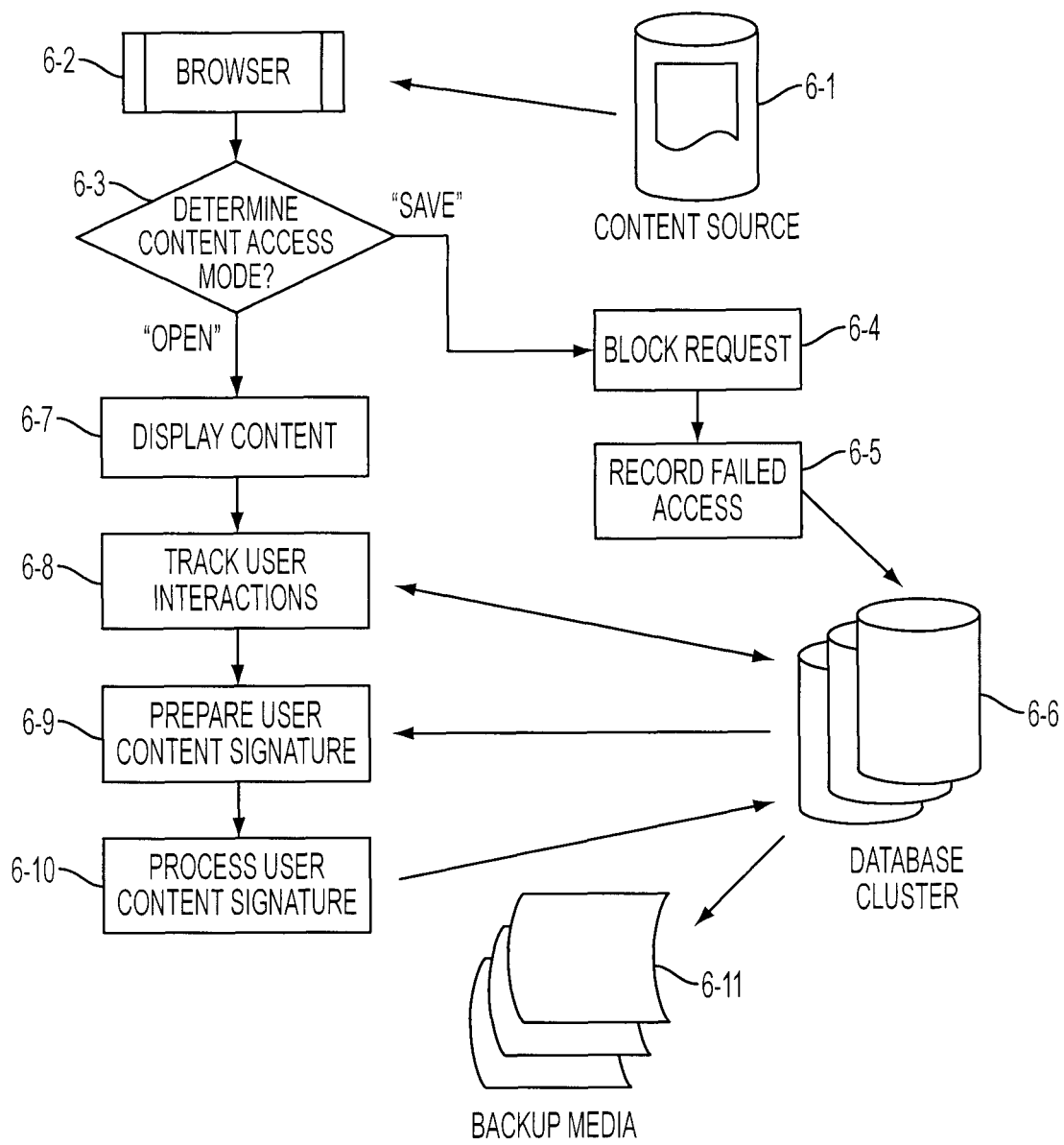
FIG. 6 is a flow diagram illustrating how the system may provide a defensible link between the content, the user, and the legal agreement signed by the user.

Referring now primarily to FIG. 6, a diagram illustrates an example of how the system maintains the integrity of user-related data throughout the process of delivering content to end users according to one or more embodiments. The data types in question include but are not limited to the data standard (CMI) for tracking user interactions with content, as well as any legal agreements associated with the content. Initially, a user's request for an electronic content is redirected to an appropriate content source 6-1, where the content is found and retrieved. This process may include the validation of the content's fingerprint against the authoritative fingerprint for the document stored in secure databases. Content validation 1-10 (FIG.1) can provide 6-2 a validated document to browser. Depending on the physical format of the content and the user's security and privacy settings in the browser, the content might not open directly to the user. Rather, the user might be presented with a dialog to open or save the content. If the user chooses to save the content, the process at 6-3 intercepts the user's choice and blocks the request at 6-4 if the choice will result in the content leaving the browser's control. This approach helps to ensure the user can only interact with the authorized and validated version of the content. After the request is blocked, at step 6-5, an entry about the user's failed attempt to access the content may be stored 6-6 in a database for reporting and auditory purposes. User-related data in the system may be stored 6-6 in databases. The databases may be replicated to safeguard against any possible data loss. Additionally, the databases may be backed up to permanent electronic storage media 6-11 on a regular basis. The backup procedures can provide for checking the integrity of the live data in the databases should a suspicion that the data had been tampered with arise. Frequency of backups can be set according to the customer's requirements. The permanent backup media maybe stored in a secured, external location, guarding against theft, fire, and other unforeseen circumstances. If 6-3 the content access mode is open, content is displayed 6-7, user interactions are tracked 6-8, the user content signature is prepared 6-9, and the user content signature is processed 6-10 and stored to database cluster 6-6.

Figure 10:
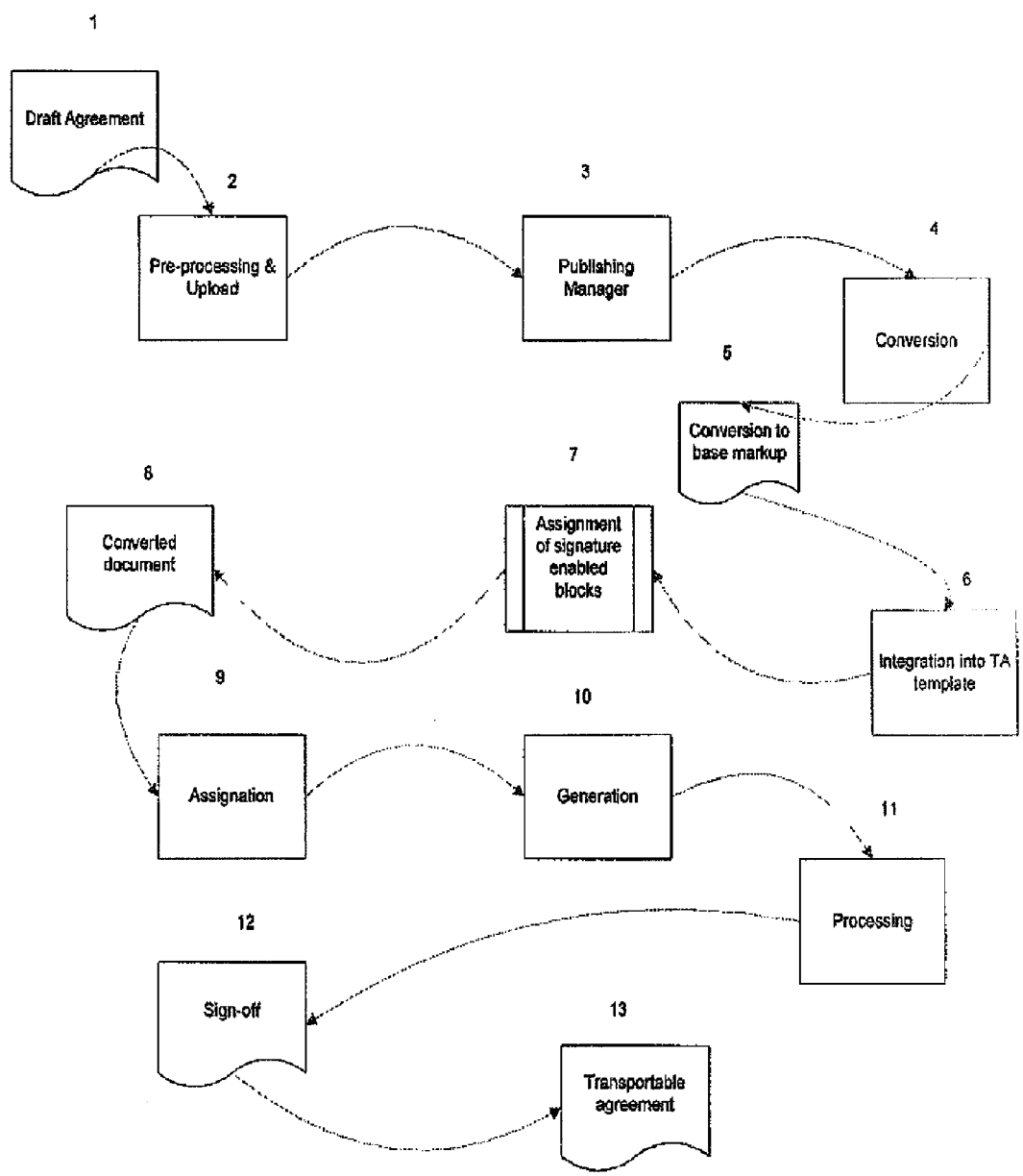
FIG. 10 is a flow diagram illustrating an embodiment of a process for ensuring that a transportable agreement may be displayed, recorded, and executed in a variety of media.

FIG. 10 describes one conversion process by which documents or document types selected to be converted to transportable agreements 13 may be prepared. The conversion process can include the steps of pre-processing and uploading 2 a draft agreement 1 that was prepared through a set-up process such as was described with respect to FIG. 1, and sending structured data in draft agreement 1 via a protocol such as, for example, HTTPS, to a server. The conversion process can also include the step, performed by a publishing manager 3, upon receiving the data, of determining that draft agreement 1 is to be converted to a transportable agreement, and the step of converting 4 draft agreement 1 to a standard format. The step of converting can be accomplished by, for example, commercially-available products, or proprietary products whose primary function is to convert from one format, for example a proprietary format, to another format, for example, a standard format. No specific implementation of the step of conversion should be considered essential the process described herein. The conversion process can also include the step of integrating 6 converted document 5 into a transportable agreement template, for example a customized template, depending on business rules that are defined to apply to the specific scenario or use case. The conversion process can include the step of assignment 7 of signature enabled blocks by including the step of the transportable agreement template's allowing the delineation of logical sections of the document to which a party's signature can be attached. As one of many examples, in the case of files which are converted to an HTML format, the signing block may be defined to all blocks enclosed within an HTML paragraph tag set, and all blocks wherein a contiguous series of underscores is detected. The precise definition of what constitutes a block can be configured to be specific to any particular organization of system user, or to any particular template or template group using either a web-based interface, an Advanced Packaging Tool (APT), a client or other interface. The conversion process can include the steps of assignation 9 of converted document 8 to a publisher, the step of assignation 9 including the step of permitting the publisher to indicate which of the predefined blocks should bear a signature or initial block, and which of the parties is required to sign, or the step of generation 10. After the publisher has indicated the appropriate content for signing and any other data to be entered by any of the parties, the conversion process can include the steps of processing 1 the converted document 8 and receiving 12 a sign-off, which returns the transportable agreement 13 for approval. After the conversion process is complete, the system can prepare to disseminate the agreements.

Figure 11:
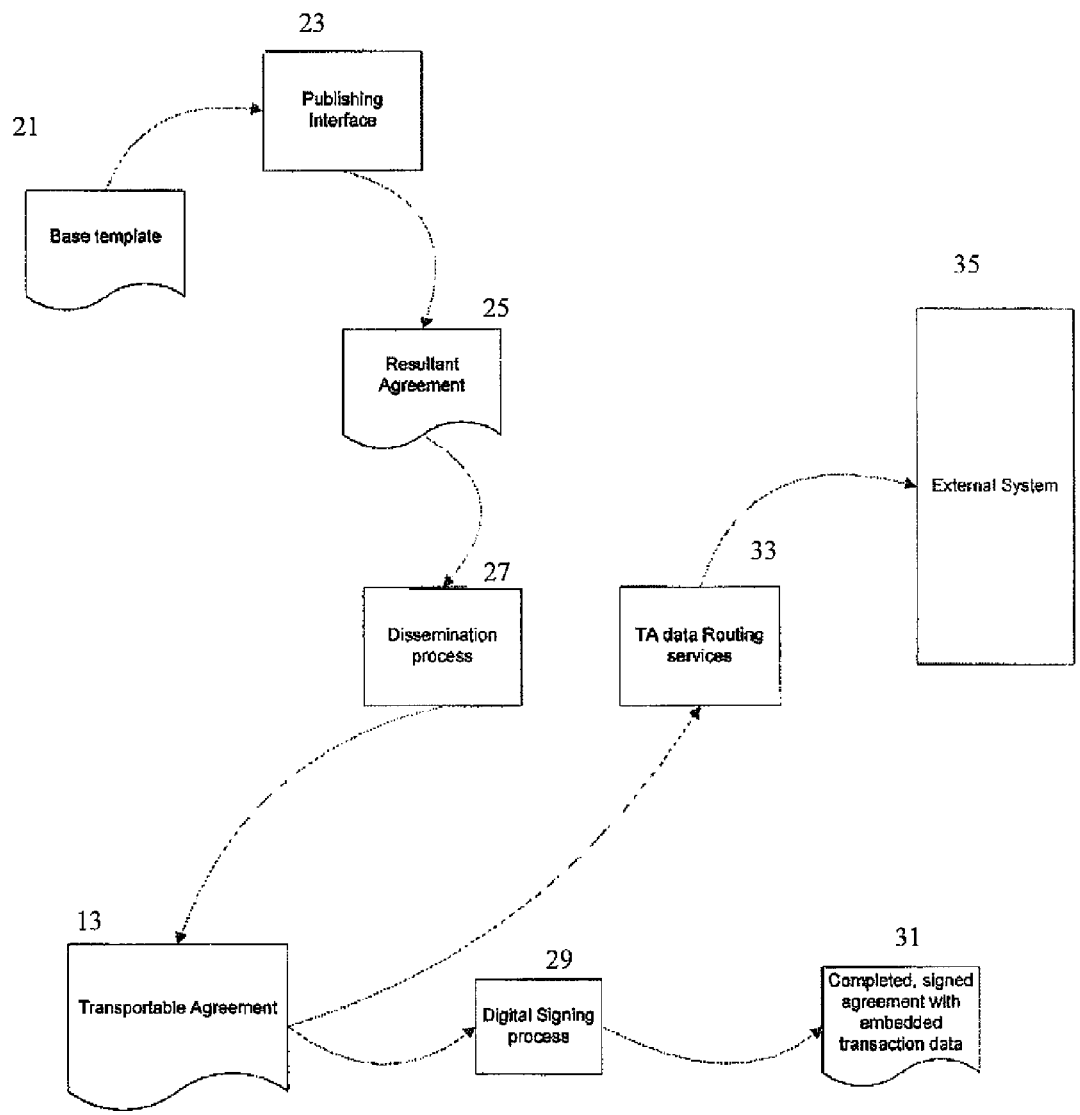
FIG. 11 is a flow diagram indicating how data flows from the client object through the routing component.

FIG. 11 describes how a transportable agreement framework can provide the option to include actionable data fields which may be used both as an interface for integrating data pertinent to the agreement between the parties into external systems, and also as way to incorporate that data as part of the agreement itself. The transportable agreement framework can include publishing interface 23 that receives base template agreement 21 from any one of a variety of interfaces. Publishing interface 23 can, for example, insert subroutines configured to communicate specific types of data to a remote server. Resultant agreement 25 can contain not only the content and workflow, but specific instructions on how data captured in user-editable fields should be handled, including the destination for, and method of communicating the data, encrypted login information, and so forth. Dissemination process 27 can process resultant agreement 25, for example, by sending it to recipients/signatories, and registering it in the system as transportable agreement 13. Transportable agreement data routing services 33 can receive data entered by the user. Data routing services 33 is configured to decrypt the data, connect to external or remote system 35, and transmit the required data. In certain cases, transportable agreement 13 may be encoded with instructions to disallow signing in the event that the remote server does not return a certain response or range of responses. In other cases, no response may be required, but in either case, such logic is embedded within transportable agreement 13. Assuming that digital signing process 29 clears transportable agreement 13, all instance data may then be transmitted to the server component which can then embed the data into the completed, signed agreement 31.

Figure 12:
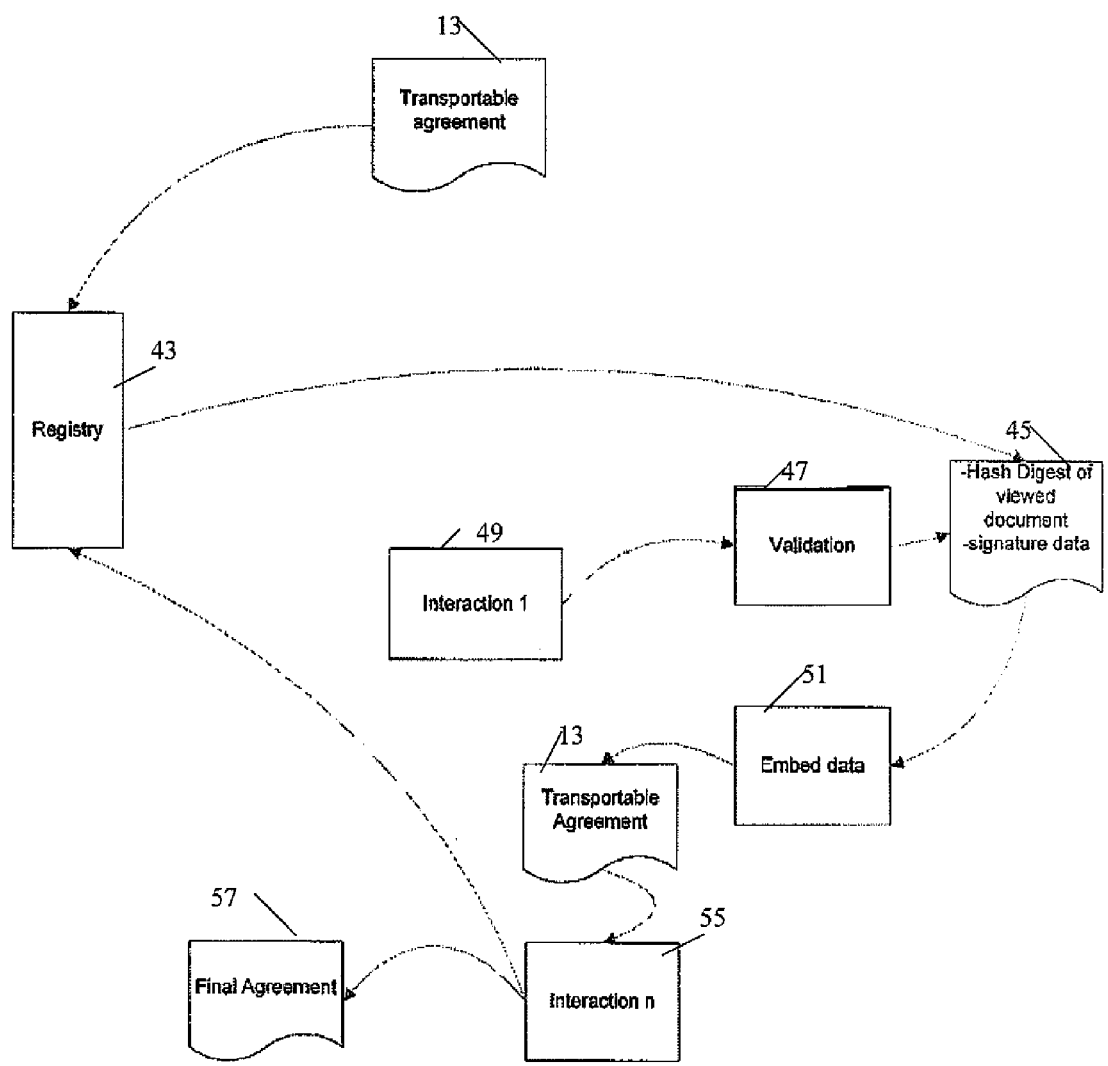
FIG. 12 is a flow diagram illustrating how an audit trail is embedded in a transportable agreement.

FIG. 12 shows how in the case of transportable agreement 13, an audit trail may be created. The audit trail can be embedded directly into transportable agreement 13 itself by storing an initial document identification and a hash digest of transportable agreement 13 in registry 43, and assembling all information, for example a hash digest 45 of signature data associated with transportable document 13 necessary for establishing the precise interaction that occurred at signing event interaction one 49: generating a hash digest 45 of the viewed document, collecting the encrypted signature(s), document ID, timestamps, other identifying data, and all related instance data and embedding 51 them into the transportable agreement 13. A new hash digest is generated for the document and stored in registry 43. This process is continued for each signatory or actor being processed, proceeding through interaction n 55, until final agreement 57 has been completed. Validation 47 can determine the validity of any copy of final agreement 57 by simply re-executing the hash algorithm on the copy and comparing it to registry 43. Working backwards, any particular state of final agreement 57 can be proven by examining the data embedded in final agreement 57. A sample of the embedded data can be seen in FIG. 13. A sample of the interface for signing can be seen in FIG. 16.

Figure 14:
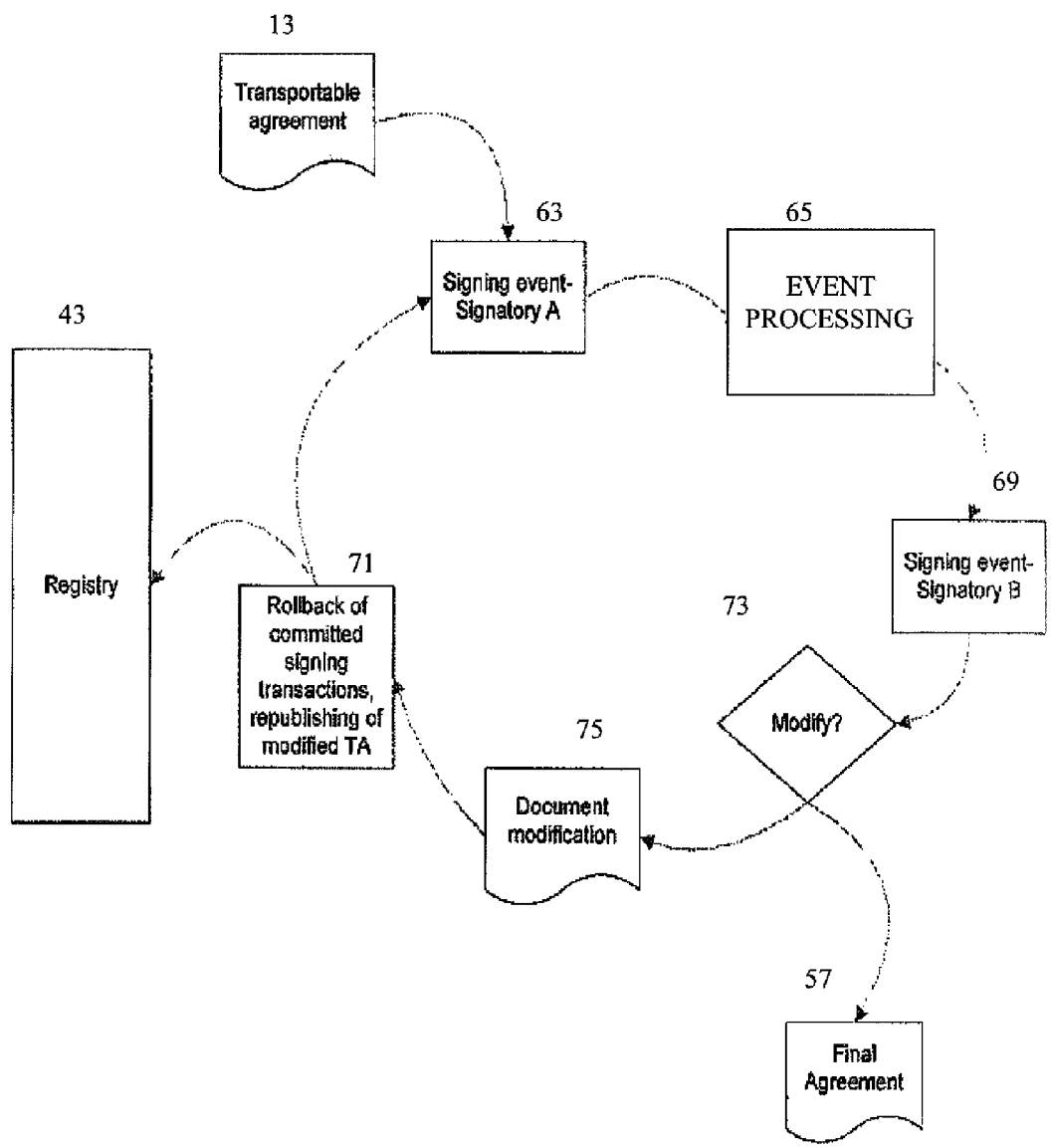
FIG. 14 is a flow diagram illustrating the process of negotiating an agreement between signatories while retaining agreement integrity.
Figure 15:
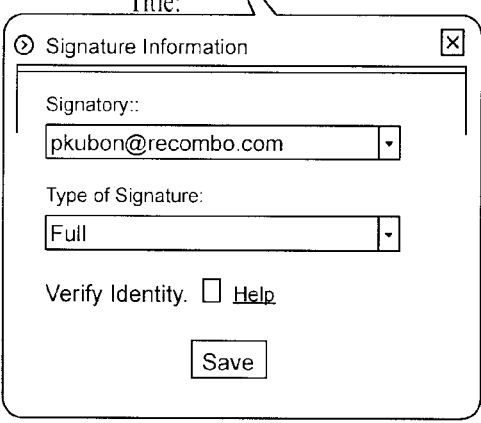
FIG. 15 is a computer screen shot illustrating an example of how publishers may select pre-defined blocks of content to assign as actionable fields.

FIG. 14 provides an illustration of the negotiation process. For transportable agreements 13 designated as negotiation-enabled, any portion of transportable agreement 13 may be edited in place by any signatory such as, for example, signatory A 63 and signatory B 69, and committed document modification 75 as part of the instance data in an audit trail update upon signing through event processing 65. If 73 a portion of the content of transportable agreement 13 is modified, the original content is marked and viewable as "struck-through" and transportable agreement 13 is modified 75 to reflect new content, if any, that replaces it. If a signatory takes this action during his signing session, the signatures of any previously signing party are rolled back 71 as part of the transaction, and notifications are issued to each one that the content has changed and requesting that they renew. All such changes are recorded in the audit section of transportable agreement 13 and registry 43, and a new transportable agreement 13 is created with both the strike-through and new content. At the point where all signatories have signed identical copies of the agreement, the agreement is considered complete, and the resulting digest is stored in registry 43.

Figure 17:
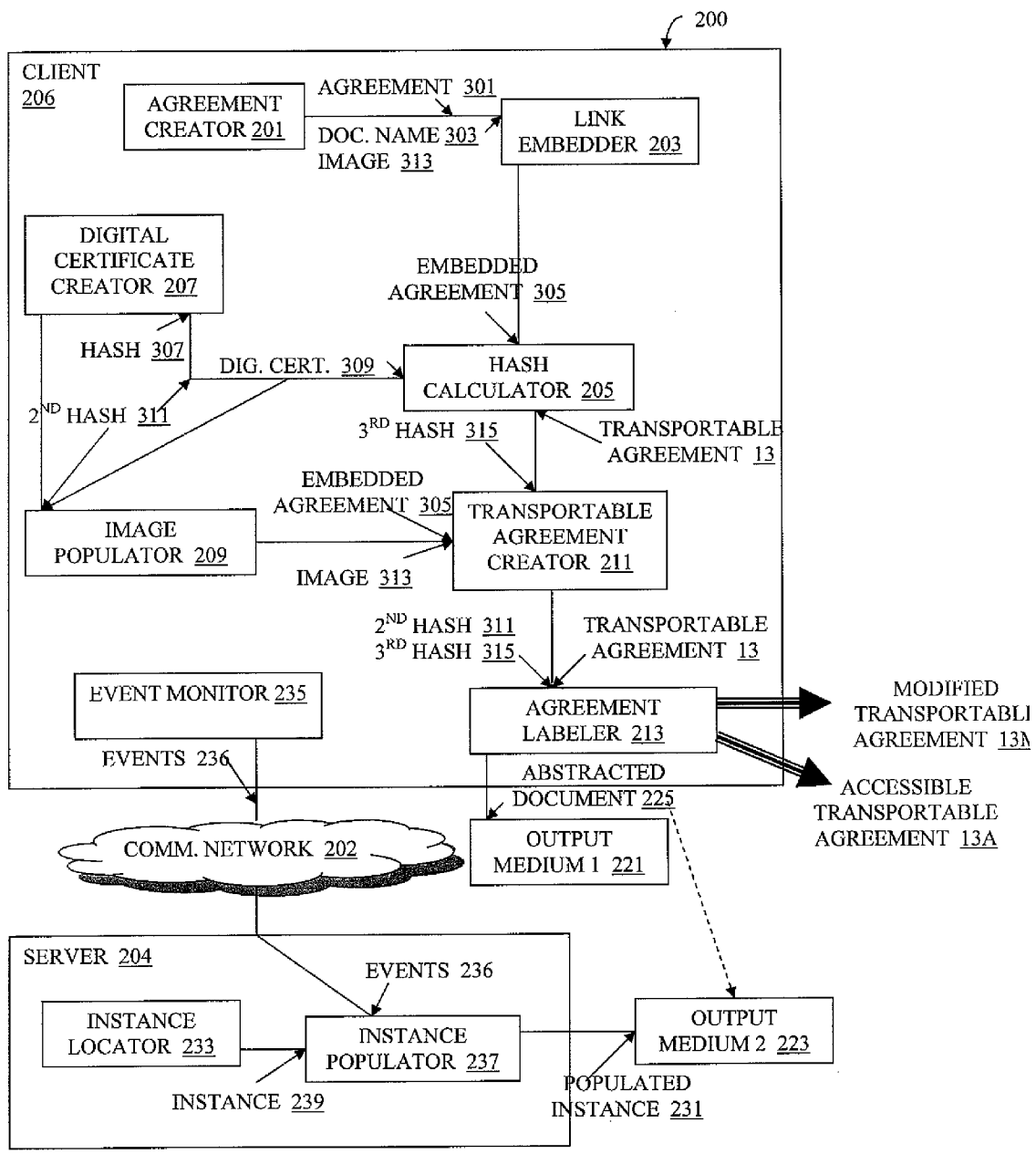
FIG. 17 is a schematic block diagram of the system of the present embodiment.

Referring now to FIG. 17, system 200 can include, but is not limited to including, agreement creator 201 configured to create agreement 301 having document name 303; link embedder 203 configured to embed in agreement 301 a link to image 313 having document name 303; hash calculator 205 configured to calculate hash 307 of agreement 301, further configured to calculate second hash 311 of hash 307 and digital certificate 309; digital certificate creator 207 configured to create digital certificate 309, for example, through steganography, that signs bash 307; image populator 209 configured to generate image 313 containing second hash 311 and digital certificate 309; transportable agreement creator 211 configured to create transportable agreement 13 including agreement 301 and image 313, said transportable agreement creator 211 configured to receive a request to access transportable agreement 13; event monitor 235 configured to capture events 236 related to transportable agreement 13 at one of the at least two of output medium one 221 or output medium two 223; agreement labeler 213 configured to label transportable agreement 13 as modified creating modified transportable agreement 13M if second hash 311 and third hash 315 do not match, further configured to label transportable agreement 13 as accessible creating accessible transportable agreement 13A if second hash 311 and third hash 315 match, and farther configured to output abstracted document 225 to either or both of output medium one 221 and/or output medium two 223; instance locator 233 configured to establish a link with computer server 204, and further configured to locate instance 239 of transportable agreement 13 on computer server 204; and instance populator 237 configured to populate instance 239 with events 236 in substantially real-time, and further configured to output populated instance 231 to at least one other of the at least two authorized users to output medium one 221 or output medium two 223. In the context of the embodiments described herein, the term substantially real-time refers to processes that are able to respond to stimuli within some small upper limit of response time. Thus, instance populator 237 populates instance 239 with events 236 within a small upper limit of response time, very near to when events 236 occur.

System 200 can optionally include an abstracter configured to abstract the transportable agreement from its output medium, and also configured to: create output templates for display media; format each character of the transportable agreement to include self-output information; receive the selection from the output media of a selected output medium; couple information from the output template associated with the selected output medium with each character to form a self-outputting character; and combine the self-outputting characters of the transportable agreement into an abstracted document; and an agreement labeler configured to output the abstracted document onto the selected output medium. System 200 can further optionally include a simultaneous output processor configured to simultaneously output the transportable agreement to at least two of the output media, and also configured to: receive a request for simultaneous viewing between the at least two of the output media; capture events related to the transportable agreement at one of the at least two of the output media; establish a link between a computer client and a computer server; locate an instance of the transportable agreement on the computer server; populate the instance with the events in substantially real-time; and provide the populated instance to at least one other of the at least two output media.

Continuing to refer to FIG. 17, system 200 can even further optionally include a search processor configured to: establish authorized users with respect to the transportable agreement; receive search criteria from one of the authorized users associated with the transportable agreement; retrieve information that satisfies the search criteria; receive a selection from one of the authorized users of the retrieved information; retrieve a selected document according to the selection; and incorporate the retrieved selected document in the transportable agreement. With respect to the search processor, system 200 can further optionally include a simultaneous output processor configured to simultaneously output the transportable agreement to multiple of the authorized users, and also configured to: receive a request for simultaneous output between at least two of the authorized users; capture events related to the transportable agreement generated by one of the at least two authorized users; establish a link with a computer server; locate an instance of the transportable agreement on the computer server; populate the instance with the events in substantially real-time; and output the populated instance to at least one other of the at least two authorized users.

Continuing to refer to FIG. 17, system 200 can include a collaboration processor configured to collaborate in preparing the transportable agreement, and also configured to: divide the transportable agreement into blocks of characters; assign a classification to each of the blocks; mark certain of the blocks as read-only according to the classification; receive a selection of at least one of the blocks from a first signer; receive attempted modifications of at least one of the characters in the selection; deny the attempted modifications if the selected block is marked as read-only; edit the block according to the attempted modifications; change the classification of the edited block if necessary according to the attempted modifications; highlight the modified at least one of the characters; present the highlighted edited block to at least one second signer; receive attempted modifications from the at least one second signer; repeat steps (iv)-(ix) for the at least one second signer; present the highlighted edited block to the first signer if the highlighted edited block was modified by the at least one second signer; repeat steps (iv)-(xiii) until there are no more of the attempted modifications; receive a signature on the transportable agreement including the highlighted edited block from the first signer and from the at least one second signer; and save the signed transportable agreement including the highlighted edited block on a computer server accessible to the first signer and the at least one second signer.

Continuing to refer to FIG. 17, system 200 can be used to execute an embodiment of a method for creating and labeling a transportable agreement that can include the steps of (a) creating agreement 301 having document name 303; (b) embedding in agreement 301 a link to image 313 having the document name 303 creating an embedded agreement 305; (c) calculating hash 307 of embedded agreement 305; (d) creating digital certificate 309 that signs hash 307; (e) calculating second hash 311 of hash 307 and digital certificate 309; (f) populating image 313 with second hash 311 and digital certificate 309; (g) creating transportable agreement 13 from embedded agreement 305 and image 313; (h) receiving a request to access transportable agreement 13; (h) calculating third hash 315 of accessed transportable agreement; (i) labeling the accessed transportable agreement as modified if second hash 311 and third hash 315 do not match; and (j) labeling accessed transportable agreement as accessible if second hash 311 and third hash 315 match.

Continuing to refer to FIG. 17, the method can also include the optional steps of abstracting transportable agreement 13 from its output medium, such as, for example, a 2d bar code, a voice transmitter, or an electronic display, for example, wireless, which can include the steps of: creating output templates for display media, formatting each character of transportable agreement 13 to include self-output information, receiving the selection from the output media of a selected output medium, coupling information from the output template associated with the selected output medium with each character to form a self-outputting character, and combining the self-outputting characters of transportable agreement 13 into abstracted document 225; and outputting abstracted document 225 onto, for example, selected output medium one 221 or selected output medium two 223. The method can further include the optional step of simultaneously outputting transportable agreement 13 to at least two output media, for example, output medium one 221 and output medium two 223, which can include the steps of: receiving a request for simultaneous viewing between the at least two of the output media, capturing events 236 related to transportable agreement 13 at one of the at least two of the output media, establishing a link with computer server 204, locating instance 239 of transportable agreement 13 on computer server 204, populating instance 239 with events 236 in substantially real-time; and providing populated instance 239 to at least one other of the at least two output media, for example, output medium one 221 and/or output medium two 223.

Continuing to still further refer to FIG. 17, the method can still further include the optional steps of establishing authorized users with respect to transportable agreement 13; receiving search criteria from one of the authorized users associated with transportable agreement 13; retrieving information that satisfies the search criteria; receiving a selection from one of the authorized users of the retrieved information; retrieving a selected document according to the selection; and incorporating the retrieved selected document in transportable agreement 13; and simultaneously outputting transportable agreement 13 to multiple of the authorized users which can include the steps of: receiving a request for simultaneous output between at least two of the authorized users, capturing events 236 related to transportable agreement 13 generated by one of the at least two authorized users, establishing a link with a computer server 204, locating instance 239 of transportable agreement 13 on computer server 204, populating instance 239 with events 236 in substantially real-time, and outputting populated instance 231 to at least one other of the at least two authorized users.

Continuing to even still further refer to FIG. 17, the method can even still further include the optional steps of (k) collaborating in preparing transportable agreement 13 which can include the steps of: (i) dividing transportable agreement 13 into blocks of characters, (ii) assigning a classification to each of the blocks, (iii) marking certain of the blocks as read-only according to the classification, (iv) receiving a selection of at least one of the blocks from a first signer, (v) receiving attempted modifications of at least one of the characters in the selection, (vi) denying the attempted modifications if the selected block is marked as read-only, (vii) editing the block according to the attempted modifications, (viii) changing the classification of the edited block if necessary according to the attempted modifications, (ix) highlighting the modified at least one of the characters, (x) presenting the highlighted edited block to at least one second signer, (xi) receiving attempted modifications from the at least one second signer, (xii) repeating steps (iv)-(ix) for the at least one second signer, (xiii) presenting the highlighted edited block to the first signer if the highlighted edited block was modified by the at least one second signer, (xiv) repeating steps (iv)-(xiii) until there are no more of the attempted modifications, and (xv) receiving a signature on transportable agreement 13 including the highlighted edited block from the first signer and from the at least one second signer; and (l) repeating steps (c)-(f) for the signed transportable agreement including the highlighted edited block; and (m) saving the signed transportable agreement including the highlighted edited block on computer server 204 accessible to the first signer and the at least one second signer.

Continuing to refer primarily to FIG. 17, according to yet another embodiment, a method for abstracting document 1-4 (FIG. 1) from its output medium can include the steps of: creating output templates for display media; formatting each character of document 1-4 (FIG. 1) to include self-output information; receiving the selection from the output media of a selected output medium such as, for example, 2d bar code, voice transmitter, and electronic display, for example, wireless; coupling information from the output template associated with the selected output medium with each character to form a self-outputting character; combining the self-outputting characters of document 1-4 (FIG. 1) into abstracted document 225; and outputting abstracted document 225 on the selected output medium.

Continuing to refer to FIG. 17, a system for collaborating in preparing an electronically-accessible transportable agreement can include, but is not limited to including an agreement divider configured to divide the electronically-accessible transportable agreement into blocks of characters; a classification assigner configured to assign a classification to each of the blocks; a block marker configured to mark certain of the blocks as read-only according to the classification; a selection receiver configured to receive a selection of at least one of the blocks from a first signer; a modification receiver configured to receive attempted modifications of at least one of the characters in the selection, said modification receiver configured to deny the attempted modifications if the selected block is marked as read-only, said modification receiver configured to edit the block according to the attempted modifications, said modification receiver configured to receive the attempted modifications from the at least one second signer and other signers; a classification modifier configured to change the classification of the edited block if necessary according to the attempted modifications; a highlighter configured to highlight the modified at least one of the characters, said highlighter configured to present the highlighted edited block to at least one second signer, said highlighter configured to present the highlighted edited block to the first signer if the highlighted edited block was modified by the at least one second signer; and a signature receiver configured to receive a signature on the electronically-accessible transportable agreement including the highlighted edited block from the first signer and from the at least one second signer, said signature receiver configured to save the electronically-accessible transportable agreement including the highlighted edited block on a computer server accessible to the first signer and the at least one second signer.

According to yet another embodiment, a method for collaborating in preparing an electronically-accessible transportable agreement can include the steps of: (a) dividing the electronically-accessible transportable agreement into blocks of characters; (b) assigning a classification to each of the blocks; (c) marking certain of the blocks as read-only according to the classification; (d) receiving a selection of at least one of the blocks from a first signer; (e) receiving attempted modifications of at least one of the characters in the selection; (f) denying the attempted modifications if the selected block is marked as read-only; (g) editing the block according to the attempted modifications; h) changing the classification of the edited block if necessary according to the attempted modifications; (i) highlighting the modified at least one of the characters; (j) presenting the highlighted edited block to at least one second signer; (k) receiving attempted modifications from the at least one second signer; (l) repeating steps (d)-(i) for the at least one second signer; (m) presenting the highlighted edited block to the first signer if the highlighted edited block was modified by the at least one second signer; (n) repeating steps (d)-(m) until there are no more of the attempted modifications; (o) receiving a signature on the electronically-accessible transportable agreement including the highlighted edited block from the first signer and from the at least one second signer; and (p) saving the electronically-accessible transportable agreement including the highlighted edited block on a computer server accessible to the first signer and the at least one second signer.

A system to support one of the embodiments described herein for abstracting a document from its output medium can include, but is not limited to including, an output template creator configured to create output templates for display media; a character formatter configured to format each character of the document to include self-output information; a selection receiver configured to receive the selection from the output media of a selected output medium; an information coupler configured to couple information from the output template associated with the selected output medium with each character to form a self-outputting character; a character combiner configured to combine the self-outputting characters of the document into an abstracted document; and a document outputer configured to output the abstracted document on the selected output medium.

A system to support another of the embodiments described herein for collaborating in preparing an electronically-accessible transportable agreement can include, but is not limited to including, an agreement divider configured to divide the electronically-accessible transportable agreement into blocks of characters; a classification assigner configured to assign a classification to each of the blocks; a block marker configured to mark certain of the blocks as read-only according to the classification; a selection receiver configured to receive a selection of at least one of the blocks from a first signer; a modification receiver configured to receive attempted modifications of at least one of the characters in the selection, said modification receiver configured to deny the attempted modifications if the selected block is marked as read-only, said modification receiver configured to edit the block according to the attempted modifications, said modification receiver configured to receive the attempted modifications from the at least one second signer and other signers; a classification modifier configured to change the classification of the edited block if necessary according to the attempted modifications; a highlighter configured to highlight the modified at least one of the characters, said highlighter configured to present the highlighted edited block to at least one second signer, said highlighter configured to present the highlighted edited block to the first signer if the highlighted edited block was modified by the at least one second signer; and a signature receiver configured to receive a signature on the electronically-accessible transportable agreement including the highlighted edited block from the first signer and from the at least one second signer, said signature receiver configured to save the electronically-accessible transportable agreement including the highlighted edited block on a computer server accessible to the first signer and the at least one second signer.

Referring again to FIG. 17, the processes depicted in FIGS. 1-3, 5, 6, 10-12, and 14, can be, in whole or in part, implemented electronically. Signals representing actions taken by elements of the embodiments can travel over electronic communications media and from node to node in communications network 202. Control and data information can be electronically executed and stored on computer-readable media (not shown). The processes can be implemented to execute on a node (client 206, server 204) in communications network 202. Common forms of computer-readable media include, but are not limited to, for example, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, a carrier wave, electronic signal, or any other medium from which a computer can read.

Although the disclosure has been described with respect to various embodiments, it should be realized this disclosure is also capable of a wide variety of further and other embodiments. The various functional features described herein may be embodied in software modules executed by one or more general purpose computers. These modules may be stored using any type of computer storage medium or device.

What is claimed is:

1. A method for creating and labeling a transportable contract/agreement comprising the steps of:
   (a) embedding, in a contract/agreement, the contract/agreement having been digitally created and having a document name, a link to an image having the document name, thus creating an embedded contract/agreement;
   (b) creating a digital certificate that signs a first hash of the embedded contract/agreement;
   (c) populating the image with a second hash and the digital certificate; the second hash being a hash of the first hash and the digital certificate;
   (d) creating the transportable contract/agreement from the embedded contract/agreement and the image;
   (e) calculating a third hash of the accessed transportable contract/agreement; and
   (f) labeling the transportable contract/agreement with one of two labels selected from modified or accessible; being labeled as modified if the second hash and a third hash, the third hash being a hash of the transportable contract/agreement, do not match or as accessible if the second hash and the third hash match;
   transportable contract/agreement is saved on a computer server; wherein data can be embedded into and recovered from said transportable contract/agreement at each step in an active portion of a lifecycle of said transportable contract/agreement; said lifecycle spanning from document creation to becoming a completed agreement.

2. The method of claim 1 wherein the digital certificate is included in the image using steganography.

3. The method of claim 1 further comprising the steps of:
   abstracting the transportable contract/agreement from an output medium including the steps of:
   creating output templates for display media;
   formatting each character of the transportable contract/agreement to include self-output information;
   receiving the selection from output media of a selected output medium;
   coupling information from the output template associated with the selected output medium with each character to form a self-outputting character; and
   combining the self-outputting characters of the transportable contract/agreement into an abstracted document; and
   outputting the abstracted document onto the selected output medium.

4. The method of claim 3 further comprising the step of:
   simultaneously outputting the transportable contract/agreement to at least two of the output media including the steps of:
   receiving a request for simultaneous viewing between the at least two of the output media;
   capturing events related to the transportable contract/agreement at one of the at least two of the output media;
   establishing a link between a computer client and a computer server;
   locating an instance of the transportable contract/agreement on the computer server;
   populating the instance with the events in real-time; and
   providing the populated instance to at least one other of the at least two output media.

5. The method of claim 3 wherein the selected output medium is a 2d bar code.

6. The method of claim 3 wherein the selected output medium is a voice transmitter.

7. The method of claim 3 wherein the selected output medium is an electronic display.

8. The method of claim 1 further comprising the steps of:
   establishing authorized users with respect to the transportable contract/agreement;
   receiving search criteria from one of the authorized users associated with the transportable contract/agreement;
   retrieving information that satisfies the search criteria;
   receiving a selection from one of the authorized users of the retrieved information;
   retrieving a selected document according to the selection; and
   incorporating the retrieved selected document in the transportable contract/agreement.

9. The method of claim 8 further comprising the step of:
   simultaneously outputting the transportable contract/agreement to multiple of the authorized users including the steps of:
   receiving a request for simultaneous output between at least two of the authorized users;
   capturing events related to the transportable contract/agreement generated by one of the at least two authorized users;
   establishing a link with a computer server;
   locating an instance of the transportable contract/agreement on the computer server;
   populating the instance with the events in real-time; and
   outputting the populated instance to at least one other of the at least two authorized users.

10. The method of claim 1 further comprising the steps of:
    (m) collaborating in preparing the transportable contract/agreement including the steps of:
       (i) dividing the transportable contract/agreement into blocks of characters;
       (ii) assigning a classification to each of the blocks;
       (iii) marking certain of the blocks as read-only according to the classification;
       (iv) receiving a selection of at least one of the blocks from a first signer;
       (v) receiving attempted modifications of at least one of the characters in the selection;
       (vi) denying the attempted modifications if the selected block is marked as read-only;
       (vii) editing the block according to the attempted modifications;
       (viii) changing the classification of the edited block if necessary according to the attempted modifications;
       (ix) highlighting the modified at least one of the characters;
       (x) presenting the highlighted edited block to at least one second signer;
       (xi) receiving attempted modifications from the at least one second signer;
       (xii) repeating steps (iv)-(ix) for the at least one second signer;
       (xiii) presenting the highlighted edited block to the first signer if the highlighted edited block was modified by the at least one second signer;
       (xiv) repeating steps (iv)-(xiii) until there are no more of the attempted modifications; and
       (xv) receiving a signature on the transportable contract/agreement including the highlighted edited block from the first signer and from the at least one second signer; and
    (n) repeating steps (c)-(f) for the signed transportable contract/agreement including the highlighted edited block; and (o) saving the signed transportable contract/agreement including the highlighted edited block on a computer server accessible to the first signer and the at least one second signer.

11. A system for creating and labeling a transportable agreement, the system comprising
at least one computer component; and
non-transitory computer usable media having computer readable code embodied therein, the computer readable code, when executed in the at least one computer component,
causing the at least one computer component to:
(a) embed, in a contract/agreement, the contract/agreement having been digitally created and having a document name, a link to an image having the document name, thus creating an embedded contract/agreement;
(b) create a digital certificate that signs a first hash of the embedded contract/agreement;
(c) populate the image with a second hash and the digital certificate; the second hash being a hash of the first hash and the digital certificate;
(d) create the transportable contract/agreement from the embedded contract/agreement and the image;
(e) calculate a third hash of the accessed transportable contract/agreement; and
(f) label the transportable contract/agreement with one of two labels selected from modified or accessible; being labeled as modified if the second hash and a third hash, the third hash being a hash of the transportable contract/agreement, do not match or as accessible if the second hash and the third hash match;
wherein the transportable contract/agreement is saved on a computer server; wherein data can be embedded into and recovered from said transportable contract/agreement at each step in an active portion of a lifecycle of said transportable contract/agreement; said lifecycle spanning from document creation to becoming a completed agreement.

12. The system of claim 11 wherein the digital certificate is included in the image using steganography.

13. The system of claim 11 wherein the computer readable code, when executed the at least one computer component, further causes the at least one computer component to:
abstract the transportable contract/agreement from an output medium including the steps of:
create output templates for display media;
format each character of the transportable contract/agreement to include self-output information;
receive the selection from output media of a selected output medium;
couple information from the output template associated with the selected output medium with each character to form a self-outputting character; and
combine the self-outputting characters of the transportable contract/agreement into an abstracted document; and
output the abstracted document onto the selected output medium.

14. The system of claim 13 wherein the selected output medium is a 2d bar code.

15. The system of claim 13 wherein the selected output medium is a voice transmitter.

16. The system of claim 13 wherein the selected output medium is an electronic display.

17. The system of claim 11 wherein the computer readable code, when executed the at least one computer component, farther causes the at least one computer component to:
establish authorized users with respect to the transportable contract/agreement;
receive search criteria from one of the authorized users associated with the transportable contract/agreement;
retrieve information that satisfies the search criteria;
receive a selection from one of the authorized users of the retrieved information;
retrieve a selected document according to the selection; and
incorporate the retrieved selected document in the transportable contract/agreement.

18. The system of claim 17 wherein the computer readable code, when executed the at least one computer component, further causes the at least one computer component to:
simultaneously output the transportable contract/agreement to multiple of the authorized users including:
receive a request for simultaneous output between at least two of the authorized users;
capture events related to the transportable contract/agreement generated by one of the at least two authorized users;
establish a link with a computer server;
locate an instance of the transportable contract/agreement on the computer server;
populate the instance with the events in real-time; and
output the populated instance to at least one other of the at least two authorized users.

19. The system of claim 11 wherein the computer readable code, when executed the at least one computer component, further causes the at least one computer component to:
(m) collaborate in preparing the transportable contract/agreement including:
(i) divide the transportable contract/agreement into blocks of characters;
(ii) assign a classification to each of the blocks;
(iii) mark certain of the blocks as read-only according to the classification;
(iv) receive a selection of at least one of the blocks from a first signer;
(v) receive attempted modifications of at least one of the characters in the selection;
(vi) deny the attempted modifications if the selected block is marked as read-only;
(vii) edit the block according to the attempted modifications;
(viii) change the classification of the edited block if necessary according to the attempted modifications;
(ix) highlight the modified at least one of the characters;
(x) present the highlighted edited block to at least one second signer;
(xi) receive attempted modifications from the at least one second signer;
(xii) repeat steps (iv)-(ix) for the at least one second signer;
(xiii) present the highlighted edited block to the first signer if the highlighted edited block was modified by the at least one second signer;
(xiv) repeat steps (iv)-(xiii) until there are no more of the attempted modifications; and
(xv) receive a signature on the transportable contract/agreement including the highlighted edited block from the first signer and from the at least one second signer; and
(n) repeat steps (c)-(f) for the signed transportable contract/agreement including the highlighted edited block; and (o) save the signed transportable contract/agreement including the highlighted edited block on a computer server accessible to the first signer and the at least one second signer.

20. A computer program product comprising:
non-transitory computer usable media having computer readable code embodied therein, the computer readable code, when executed in at least one computer component, causing the at least one computer component to:
(a) embed, in a contract/agreement, the contract/agreement having been digitally created and having a document name, a link to an image having the document name, thus creating an embedded contract/agreement;
(b) create a digital certificate that signs a first hash of the embedded contract/agreement;
(c) populate the image with a second hash and the digital certificate; the second hash being a hash of the first hash and the digital certificate;
(d) create the transportable contract/agreement from the embedded contract/agreement and the image;
(e) calculate a third hash of the accessed transportable contract/agreement, and
(f) label the transportable contract/agreement with one of two labels selected from modified or accessible; being labeled as modified if the second hash and a third hash, the third hash being a hash of the transportable contract/agreement, do not match or as accessible if the second hash and the third hash match;
wherein the transportable contract/agreement is saved on a computer server; wherein data can be embedded into and recovered from said transportable contract/agreement at each step in an active portion of a lifecycle of said transportable contract/agreement; said lifecycle spanning from document creation to becoming a completed agreement.

21. The computer program product of claim 20 wherein the computer readable code, when executed the at least one computer component, further causes the at least one computer component to:
abstract the transportable contract/agreement from an output medium including the steps of:
create output templates for display media;
format each character of the transportable contract/agreement to include self-output information;
receive the selection from output media of a selected output medium;
couple information from the output template associated with the selected output medium with each character to form a self-outputting character; and
combine the self-outputting characters of the transportable contract/agreement into an abstracted document; and
output the abstracted document onto the selected output medium.

22. The computer program product of claim 21 wherein the computer readable code, when executed the at least one computer component, further causes the at least one computer component to:
establish authorized users with respect to the transportable contract/agreement;
receive search criteria from one of the authorized users associated with the transportable contract/agreement;
retrieve information that satisfies the search criteria;
receive a selection from one of the authorized users of the retrieved information;
retrieve a selected document according to the selection; and
incorporate the retrieved selected document in the transportable contract/agreement.

23. The computer program product of claim 22 wherein the computer readable code, when executed the at least one computer component, further causes the at least one computer component to:
simultaneously output the transportable contract/agreement to multiple of the authorized users including:
receive a request for simultaneous output between at least two of the authorized users;
capture events related to the transportable contract/agreement generated by one of the at least two authorized users:
establish a link with a computer server;
locate an instance of the transportable contract/agreement on the computer server;
populate the instance with the events in real-time; and
output the populated instance to at least one other of the at least two authorized users.

24. The computer program product of claim 21 wherein the computer readable code, when executed the at least one computer component, further causes the at least one computer component to:
(m) collaborate in preparing the transportable contract/agreement including:
(i) divide the transportable contract/agreement into blocks of characters;
(ii) assign a classification to each of the blocks;
(iii) mark certain of the blocks as read-only according to the classification;
(iv) receive a selection of at least one of the blocks from a first signer;
(v) receive attempted modifications of at least one of the characters in the selection;
(vi) deny the attempted modifications if the selected block is marked as read-only;
(vii) edit the block according to the attempted modifications;
(viii) change the classification of the edited block if necessary according to the attempted modifications;
(ix) highlight the modified at least one of the characters;
(x) present the highlighted edited block to at least one second signer;
(xi) receive attempted modifications from the at least one second signer;
(xii) repeat steps (iv)-(ix) for the at least one second signer;
(xiii) present the highlighted edited block to the first signer if the highlighted edited block was modified by the at least one second signer;
(xiv) repeat steps (iv)-(xiii) until there are no more of the attempted modifications; and
(xv) receive a signature on the transportable contract/agreement including the highlighted edited block from the first signer and from the at least one second signer; and
(n) repeat steps (c)-(f) for the signed transportable contract/agreement including the highlighted edited block; and
(o) save the signed transportable contract/agreement including the highlighted edited block on a computer server accessible to the first signer and the at least one second signer.

* * * * *

UNITED STATES PATENT AND TRADEMARK OFFICE
CERTIFICATE OF CORRECTION

PATENT NO. : 8,688,992 B2
APPLICATION NO. : 11/934487
DATED : April 1, 2014
INVENTOR(S) : Shawn Daniels et al.

It is certified that error appears in the above-identified patent and that said Letters Patent is hereby corrected as shown below:

In the Claims

In column 17, line 6 (claim 11), "the system comprising" should read -- the system comprising: --

In column 17, line 43 (claim 13), "when executed the at least one computer component" should read -- when executed in the at least one computer component --

In column 17, line 66 (claim 17), "when executed the at least one computer component" should read -- when executed in the at least one computer component --

In column 17, line 67 (claim 17), "farther causes" should read -- further causes --

In column 18, line 13 (claim 18), "when executed the at least one computer component" should read -- when executed in the at least one computer component --

In column 18, line 30 (claim 19), "when executed the at least one computer component" should read -- when executed in the at least one computer component --

In column 19, lines 38-39 (claim 21), "when executed the at least one computer component" should read -- when executed in the at least one computer component --

In column 19, lines 56-57 (claim 22), "when executed the at least one computer component" should read -- when executed in the at least one computer component --

In column 20, lines 6-7 (claim 23), "when executed the at least one computer component" should read -- when executed in the at least one computer component --

In column 20, lines 23-24 (claim 24), "when executed the at least one computer component" should read -- when executed in the at least one computer component --

Signed and Sealed this
Seventeenth Day of June, 2014

Michelle K. Lee
*Deputy Director of the United States Patent and Trademark Office*